United States Patent
Frederiks et al.

(10) Patent No.: US 7,760,700 B2
(45) Date of Patent: Jul. 20, 2010

(54) FAST CONTROL MESSAGING MECHANISM FOR USE IN WIRELESS NETWORK COMMUNICATIONS

(75) Inventors: Guido Robert Frederiks, Monte Sereno, CA (US); Vincent K. Jones, Redwood City, CA (US); Alireza Raissinia, Monte Sereno, CA (US)

(73) Assignee: Qualcomm Incorporated, San Diego, CA (US)

( * ) Notice: Subject to any disclaimer, the term of this patent is extended or adjusted under 35 U.S.C. 154(b) by 234 days.

(21) Appl. No.: 11/531,210

(22) Filed: Sep. 12, 2006

(65) Prior Publication Data
US 2007/0058566 A1    Mar. 15, 2007

Related U.S. Application Data

(60) Provisional application No. 60/716,576, filed on Sep. 12, 2005.

(51) Int. Cl.
*H04B 7/212* (2006.01)
*H04J 3/00* (2006.01)
*H04J 1/00* (2006.01)

(52) U.S. Cl. ............... 370/347; 370/310; 370/343; 370/345

(58) Field of Classification Search ......... 370/310, 370/343, 345
See application file for complete search history.

(56) References Cited

U.S. PATENT DOCUMENTS

| | | | | |
|---|---|---|---|---|
| 6,172,975 | B1 * | 1/2001 | Sallee | 370/359 |
| 6,944,161 | B2 * | 9/2005 | Sandell | 370/395.1 |
| 2006/0056345 | A1 * | 3/2006 | Marinier et al. | 370/329 |
| 2006/0209782 | A1 * | 9/2006 | Miller et al. | 370/349 |

* cited by examiner

*Primary Examiner*—Patrick N Edouard
*Assistant Examiner*—Matthew W Genack
(74) *Attorney, Agent, or Firm*—Turocy & Watson, LLP

(57) ABSTRACT

In a wireless network according to embodiments of the present invention, fast control messaging frames are used to signal control information. A fast control messaging ("FCM") frame includes MAC layer control bits in a PLCP header, obviating the need for a PSDU. These frames can be used in 802.11n wireless networks as well as in other suitable 802.11x networks as well as non-802.11x networks to exchange control information while significantly reducing network overhead. In some embodiments, some information that might have been conveyed to a receiver's MAC layer in a PSDU is conveyed by including that information is a PLCP header and having logic within the receiver's PHY layer processing to process that information and convey that information up to the receiver's MAC layer in a simulated PSDU or other method. The indicator of an FCM frame can be a bit in a PLCP header, a modification of a CRC field of the PLCP header, or other indicator. The medication of the CRC field of the PLCP header can be an inversion of the CRC field, a translation of the CRC field by a constant value, or both, or some other variation.

19 Claims, 4 Drawing Sheets

FAST CONTROL MESSAGING MECHANISM FOR USE IN WIRELESS NETWORK COMMUNICATIONS

CROSS-REFERENCES TO RELATED APPLICATIONS

This application claims priority from U.S. Provisional Application 60/716,576 entitled "Fast Control Messaging Mechanism" and filed on Sep. 12, 2005. That application is incorporated herein by reference for all purposes.

FIELD OF THE INVENTION

The present invention relates to wireless networking in general and in particular to efficient control messaging.

BACKGROUND OF THE INVENTION

Wireless networks have become quite popular, but higher throughput wireless networks are constantly in demand. The throughput of a wireless network is a function of the bandwidth allocated to the wireless network and the data rates used, but the throughput also depends on the overhead, i.e., the proportion of the available bits that are allocated to signaling and control functions as opposed to conveying data between nodes of the network. If a fixed number of bits are available over a unit of time, if fewer of the available bits are consumed by signaling and control, then more bits are available for data transfer.

There are certain signals that are required in an efficient wireless network, such as signals used to convey to some stations that other stations are reserving the medium, to convey the existence of stations, and the like.

FIG. 1 illustrates the basic structure of conventional PPDU (PLCP Protocol Data Unit) frames. These frames all depend on and include a PLCP (Physical-Layer Convergence Procedure) preamble and a PLCP header followed by a PSDU (PLCP Service Data Unit). Where the PSDU is a control frame, it is typically sent at a basic service set rate, such as 1 Mbps (megabit-per-second) or 6 Mbps, so that all stations can be expected to hear and understand these frames.

A station will receive signals and process them in layers, with the station's physical (PHY) layer receiving the signal from the wireless medium, processing it and passing up the results of the processing to the station's media access control (MAC) layer, which in turn performs MAC processing and passes the results up to the next layer and so on. When the PHY layer gets the PPDU, it processes it to determine what bits were sent, corrects for correctable errors, then discards the PPDU if the errors are uncorrectable (and may also trigger error processing) or sends up the payload of the PPDU to the MAC (which is the PSDU contents, in this case). The MAC layer then decodes the PSDU and interprets its contents, such as by triggering control actions specified by the contents of a PSDU control frame.

Examples of PSDU control frames include frames used for an RTS-CTS ("Ready-To-Send/Clear-To-Send") handshake. In an RTS-CTS handshake, one station might send an RTS message to an access point (or other coordinator or receiver) and the access point responds with a CTS message. All other stations hearing the CTS message will then know not to use the wireless medium, to avoid interfering with the station that sent the RTS message. If a station cannot hear and understand the CTS message (the hidden node problem), it might not know to defer and might interfere with a transmission. Because of this potential problem, as many stations as possible need to be able to receive and interpret these frames, so it would not be ideal to send them at high data rates that only some stations can receive. However, because of the low data rate, these frames take quite a lot of time to transmit, even though they are small frames. The time spent transmitting those frames is pure overhead, because no effective data transfer can happen during that time. Thus, if these frames could be made more efficient, data throughput would improve.

BRIEF SUMMARY OF THE INVENTION

In a wireless network according to embodiments of the present invention, fast control messaging frames are used to signal control information. A fast control messaging ("FCM") frame includes MAC layer control bits in a PLCP header, obviating the need for a PSDU.

These frames can be used in 802.11n wireless networks as well as in other suitable 802.11x networks as well as non-802.11x networks to exchange control information while significantly reducing network overhead.

In some embodiments, some information that might have been conveyed to a receiver's MAC layer in a PSDU is conveyed by including that information in a PLCP header and having logic within the receiver's PHY layer processing to process that information and convey that information up to the receiver's MAC layer in a simulated PSDU or other method.

The indicator of an FCM frame can be a bit in a PLCP header, a modification of a CRC field of the PLCP header, or other indicator. The modification of the CRC field of the PLCP header can be an inversion of the CRC field, a translation of the CRC field by a constant value, or both, or some other variation.

The following detailed description together with the accompanying drawings will provide a better understanding of the nature and advantages of the present invention.

BRIEF DESCRIPTION OF THE DRAWINGS

FIG. 7 shows plot of RTS-CTS improvements when FCM mechanisms are used.

DETAILED DESCRIPTION OF THE INVENTION

An improved messaging approach is described herein that might be used with conventional or novel wireless networks, wherein stations might or might not have a capability to understand (i.e., properly process) the novel fast control messaging described herein. The present disclosure describes embodiments of wireless network stations (e.g., client devices, access points). In specific embodiments, a wireless network comprises a plurality of devices that operate as nodes in an 802.11x (x=a, b, e, g, n, etc.) wireless network, or other wireless network having similar issues. "802.11x" will be understood to refer herein to any applicable 802.11 format such as, but not limited to, 802.11a, 802.11g, 802.11n, etc.).

Figure 1:
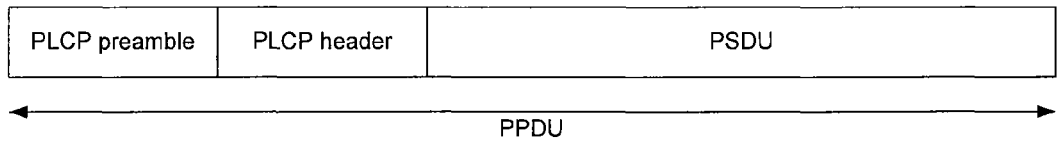
FIG. 1 is a schematic diagram of a conventional PPDU frame.
Figure 2:
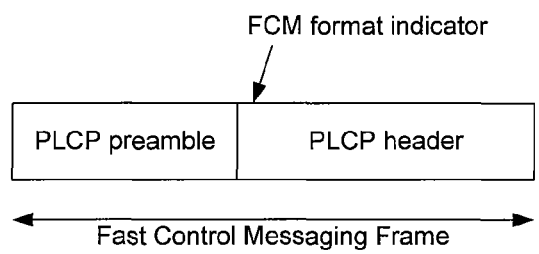
FIG. 2 is a schematic diagram of an example format for a fast control messaging ("FCM") frame.

In the new fast control messaging mechanism, a modified PPDU frame can comprise a PLCP preamble and a PLCP header, without requiring a PSDU, as illustrated in FIG. 2. The PLCP header includes an indication that a receiver could use in PHY processing to determine whether the PPDU was of a legacy format having a PSDU or of a "fast control messaging format" frame ("FCM frame") format not necessarily having a PSDU. Information that needs to be conveyed up to the receiver's MAC layer can be transmitted as part of the header and extracted by the receiver's PHY layer logic and sent up to the MAC layer.

In a typical wireless network, a number of stations are communicating using protocols defined and expected for that wireless network. Each station might be a logical node of the wireless network and might be implemented by hardware for data processing and radio transmission/reception, etc. For example, a station might be a wireless network card or circuit built into a computing device such as a laptop, cell phone, handheld computer, etc. or a station might be an access point, such as a router mounted in a space to form a wireless access zone (such as an 802.11 BSS cloud) and couple the wireless network to a wired network via the router. A station device thus might have a power source, wired data inputs/outputs, logic for processing data (perhaps using a network-layer scheme, wherein logic for one layer is more or less isolated from higher and/or lower layers and each layer's logic processes data in a form for that layer), modulators/demodulators, signal processing hardware/software/firmware, RF signal generators, RF signal receivers and digitizers, antennas and other incidents of a typical wireless networking device, module, card, circuit or apparatus.

FCM Frame Overview

A PPDU frame that is modified to be an FCM frame includes an indicator that signals to a receiver that the frame is in fact an FCM frame. A number of different options for indicators are described hereinbelow.

FIG. 2 illustrates an FCM frame wherein the FCM indicator is a single bit set in the PLCP header. An alternative approach is to manipulate the inserted CRC (Cyclic Redundancy Check), such as by inverting it or subtracting/adding a constant value from/to it (or subtracting/adding a constant value from/to the inverted version, etc.). In any case, there would be a valid CRC for a legacy frame and a valid CRC that indicates an FCM frame. With the CRC approach, a legacy receiver would treat the FCM-indicating CRC as being an invalid CRC and discard the frame.

As used herein, "legacy" refers to older or newer devices that are configured for wireless communication but are not configured to properly process FCM frames. An example is an 802.11b receiver that is not configured to properly process FCM frames, i.e., a receiver that doesn't know about the FCM protocol. The CRC manipulation mechanisms described above would work with existing preamble structures in the 802.11b framework, for example, without breaking legacy functionality. This would allow for FCM-aware stations to use FCM frames among themselves without interfering with legacy-legacy station communication or legacy-"FCM-aware" communications ("FCM-aware" referring to stations that know about FCM frames but do not necessarily use them). When receiving an FCM frame with a CRC modified to signal an FCM indication, legacy devices would detect a CRC error and defer from receiving the frame.

In the case where the FCM indication is a dedicated bit, the PHY would look for this bit and verify the CRC. If the bit is present and the CRC is correct, the PHY would pass the control bits for the MAC up. In the case where the FCM indication is a CRC inversion, the PHY would check for a valid CRC (which would indicate a normal frame and thus expect a PSDU) and would check for a valid inverted CRC (which would indicate a valid FCM frame).

There are other alternatives for manipulating the CRC and this mechanism can be combined with some other indication in the PLCP preamble. In each case, the same effect occurs: PHY preamble bits get passed on to the MAC layer and need not be interpreted by the PHY, other than typical PHY operations still required. Note that the preamble bits that indicate how long the PSDU is would not need to be interpreted by the PHY when it does not expect a PSDU and the PHY layer knows whether or not to expect a PSDU and reacts accordingly.

Note that a PSDU might still show up, but for most embodiments, that should be ignored and its existence for no purpose may cause reduction in goodput (the rate of useful data that is transmitted and received). Instead, the sender of the FCM frame should stop transmitting after the PLCP header has been transmitted and the medium should then become idle. The PHY layer logic, upon determining that the frame is done, can signal the MAC layer logic that an FCM frame was received and pass up the control bits (from the PLCP header).

Figure 3:
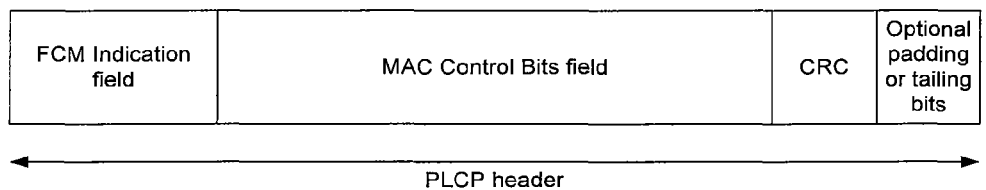
FIG. 3 is a schematic diagram of one alternative for encoding an FCM indicator and MAC control bits into an FCM frame header.

FIG. 3 illustrates a more detailed example of one possible embodiment format for such a modified PLCP header. Upon reception of the above described frame, the PHY logic of an appropriately configured station would be used to analyze the PLCP header and detect the FCM indication. If the CRC is correct and the FCM indication is set, the PHY logic would understand not to expect a PSDU following the PLCP header and process incoming signals accordingly. If a PSDU is transmitted anyway, it should be ignored by the receiver, but preferably stations setting the FCM indication would leave off the PSDU to leave open more time for data transmission as opposed to overhead.

The MAC Control Bits field of the FCM PLCP can be passed on to the receiver's MAC layer logic, where the processing of the control bits of that field might be formatted to be presentable to the receiver's MAC layer for further processing.

Since an FCM frame is one of the more robust ones in the 802.11n framework, the use of FCM frames in a network might provide for extended range operations in that network. Another advantage of FCM frames is that by being so short, they can be used in place of other mechanisms to move control data around, further improving effective data throughput.

With FCM frames, exchange control information can be exchanged among MAC layers without requiring MPDUs (MAC Protocol Data Units). A new set of control functions can be defined using the MAC Control Bits field of the PLCP header. In embodiments that use the WWiSE-defined SIG-N field, the MAC Control Bits field could provide up to 43 bits of control information for use at the MAC layer.

Legacy devices, as defined herein, would not be able to receive the FCM frame format and would properly defer. These FCM frames would be used for communication between devices that support the FCM feature. If FCM frames were used to reserve a medium among FCM-enabled stations, if legacy devices are also present, alternative methods might be used to reserve the medium for those legacy devices, to ensure that legacy devices understood the medium reservation. Such alternatives could be built into the logic for implementing FCM frames in such devices.

Fast Control Messaging with Implicit Addressing

If a station (STA) is addressed via an FCM frame, it might not be possible to include full MAC addresses in the control bits, due to having only a limited set of information bits available. An alternative addressing scheme can be used to cover this limitation. For example, instead of six-byte STA addresses, one-byte or two-byte AIDs (Association Identifiers) could be used. In some embodiments, an access point (AP) might provide each station, upon association with that AP, a mapping table of AID and MAC addresses for that AP's basic service set (BSS). This would be readily workable since, for example, a network having less than 256 associated stations could use one-byte AIDs and still have a unique "local address" for each station.

For some communications, the address in the FCM frame can be inferred, so the address can be left off entirely. For instance, a device can be configured so that if it sends a frame to another station and the next transmission is an immediate acknowledgement (ACK) in an FCM frame, the device infers that the address of the sender of the immediate ACK is the same as the address of the other station to which the device sent the prior frame. Thus, one station sends a frame to a destination station using the destination station's address (MAC, AID, etc.) and that one station is the only station expecting an ACK, and if a frame starts to be sent within a SIFS (Short Interframe Space) time, the one station infers that the sender of the ACT is the destination station. The inference might be dependent on the one station receiving the particular ACK it was anticipating. This would be a form of an implicit addressing mechanism.

Example Structure for a MAC Control Bits Field

Figure 4:
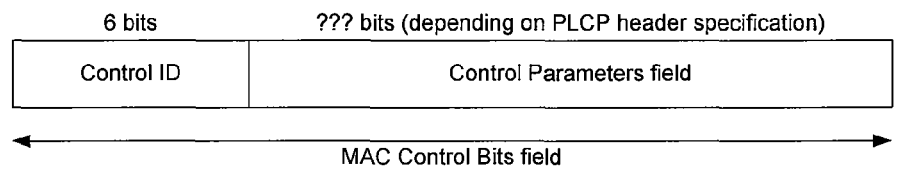
FIG. 4 is a schematic diagram of one example for a MAC Control Bits field encoded in an FCM frame header.

FIG. 4 gives an overview of a generic structure that could be used to encode MAC control information. A "Control ID" field could indicate the kind of control command and a "Control Parameters" field could indicate the parameters corresponding to the command.

Example Use Case: Enhanced RTS-CTS

Figure 5:
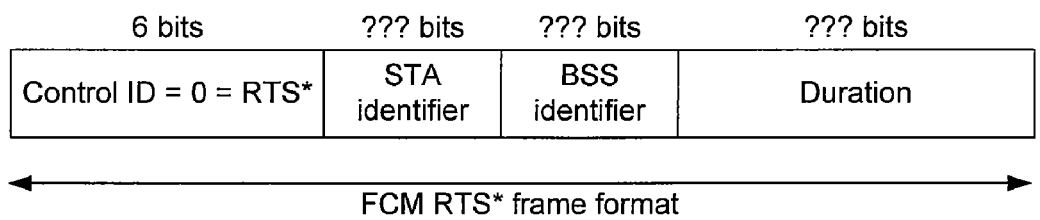
FIG. 5 is a schematic diagram of one example of an FCM frame for an RTS message.
Figure 6:
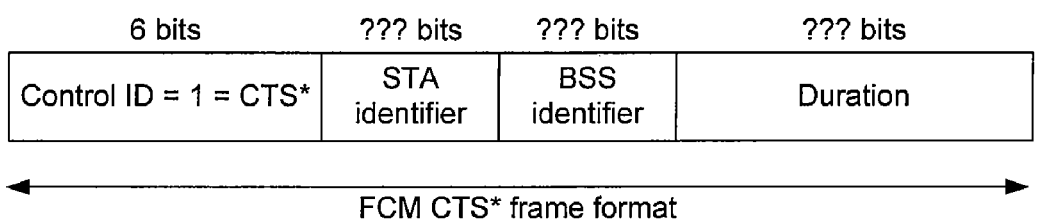
FIG. 6 is a schematic diagram of one example of an FCM frame for a CTS message.

A legacy RTS-CTS exchange could be rewritten in a fast control messaging format as described herein. An RTS frame could be formatted as shown in FIG. 5 and a CTS frame could be formatted shown in FIG. 6. This mechanism could be used in an 802.11n (only) network or other network.

The gain in amount of time available for data frames transfer, due to not having to send the MPDU portion that indicates RTS/CTS is indicated in FIG. 7 for certain conditions. Other results might be obtained for other conditions. This plot of FIG. 7 is based on calculations assuming that the TXOP is started with an RTS-CTS exchange. Generally, the improvement that can be expected is $IMP=(T_{FCM}/T_{NORM})-1$, where $T_{FCM}$ is the time used using FCM frames, or (TXOP time−(time taken by FCM RTS-CTS exchange)) and $T_{NORM}$ is the time used using normal frames or (TXOP time−(time taken by normal RTS-CTS exchange)). Percentage improvement would then be IMP*100%.

Figure 7A:
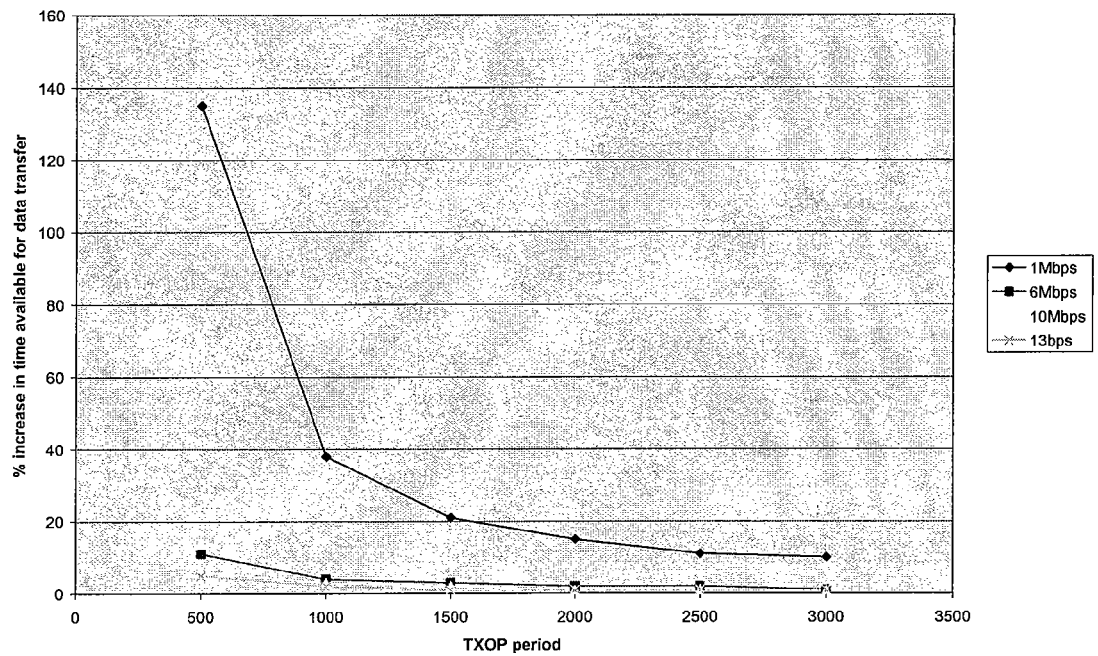
FIG. 7A shows one scale and FIG. 7B shows another scale.
Figure 7B:
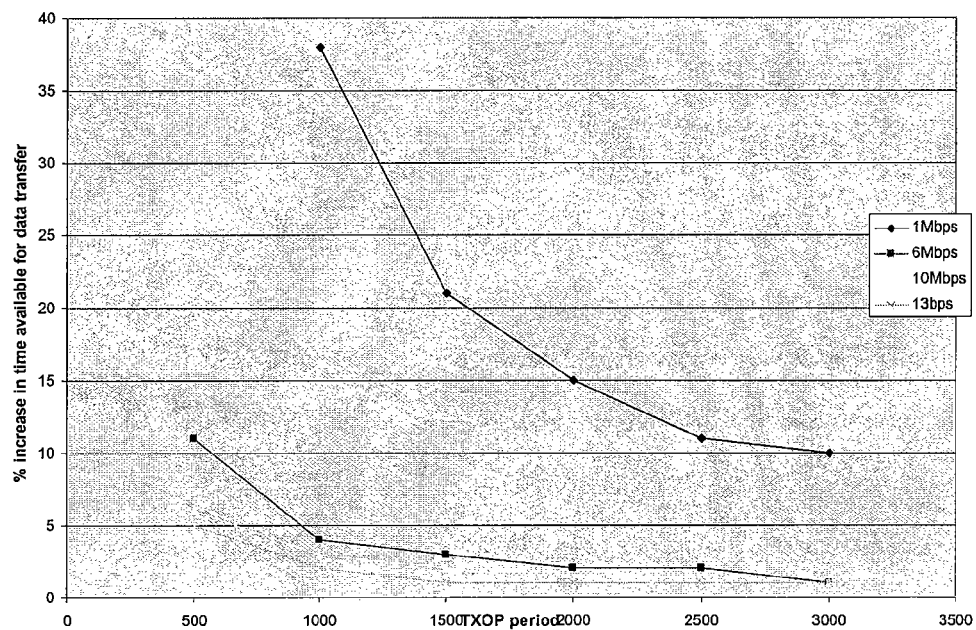

This is illustrated by the plot of FIG. 7; FIG. 7A is a plot including all data points; FIG. 7B is a plot omitting the data point in the upper left portion of the graph so that the remainder of the data points are more clearly shown with a smaller range of values on the Y axis. As FIG. 7 clearly illustrates, most of the gain is achieved when the basic rate set is a low rate and the TXOP time used after the RTS-CTS exchange is relatively short. Low data rates for RTS-CTS exchange are very common, especially in extended range modes, and there are many scenarios where the TXOP will be relatively short, so there are many opportunities for gain.

Example Use Case: Enhanced ACK

Figure 8:
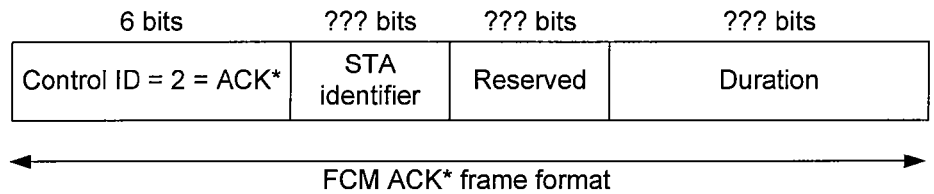
FIG. 8 is a schematic diagram of one example of an FCM frame for an ACK.

A legacy FRAME-ACK exchange could be rewritten in a fast control messaging format as described herein. The ACK could be formatted as shown in FIG. 8.

If the fast control messaging with implicit addressing mechanism as described before is used, no STA identifier would be needed. In the simplest scenario, only the Control ID indicating that ACK is needed and the other fields shown in FIG. 8 can be omitted. This frame could be used instead of the legacy ACK and would reduce the medium overhead on all frame exchanges involving immediate ACKs, including frame exchanges with management frames and data frames where immediate ACK is requested.

Performance improvement with this mechanism is dependent on data rates and the number of ACKs sent. However, in general, the lower the data rates and the more ACKs sent, the more medium efficiency will be achieved. Because of the operation of a typical wireless network, as link quality goes down (due to growing distance between stations, interference, multi-path, etc.) and lower data rates tend to be used more, aggregation is disabled and other measures are taken. In such cases, immediate ACKs will be enabled, and using this mechanism will provide more payoff.

Example Use Case: Immediate Aggregated ACK

This is an example of new types of frame exchange formats that could be created. If a station receives a burst of aggregated PPDUs/MPDUs, it could at the end of the aggregation send an "immediate aggregated ACK" back.

In such a frame, the STA would indicate which frames were received correctly. In the existing block ACK frame, the ACK bitmap is based on a start sequence number, but in this frame, the ACK bitmap would correspond to the place of the received frame in the aggregation. The first frame in the aggregation corresponds to the first bit in the bitmap. The second frame in the aggregation corresponds to the second bit in the bitmap, etc.

Figure 9:
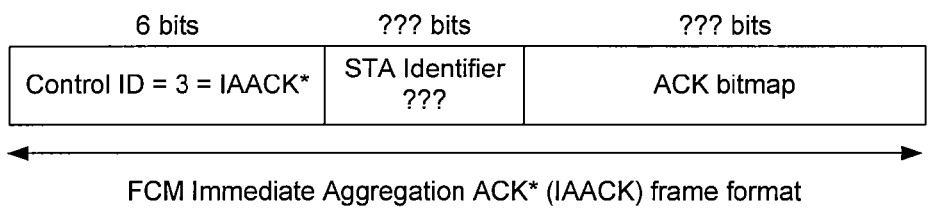
FIG. 9 is a schematic diagram of one example of an FCM frame for an immediate aggregation ACK.

The immediate aggregated ACK could be formatted as shown in FIG. 9. In some embodiments, a duration field is added, and in some embodiments, the STA identifier is not needed where the implicit addressing scheme described above is used.

Figure 10:
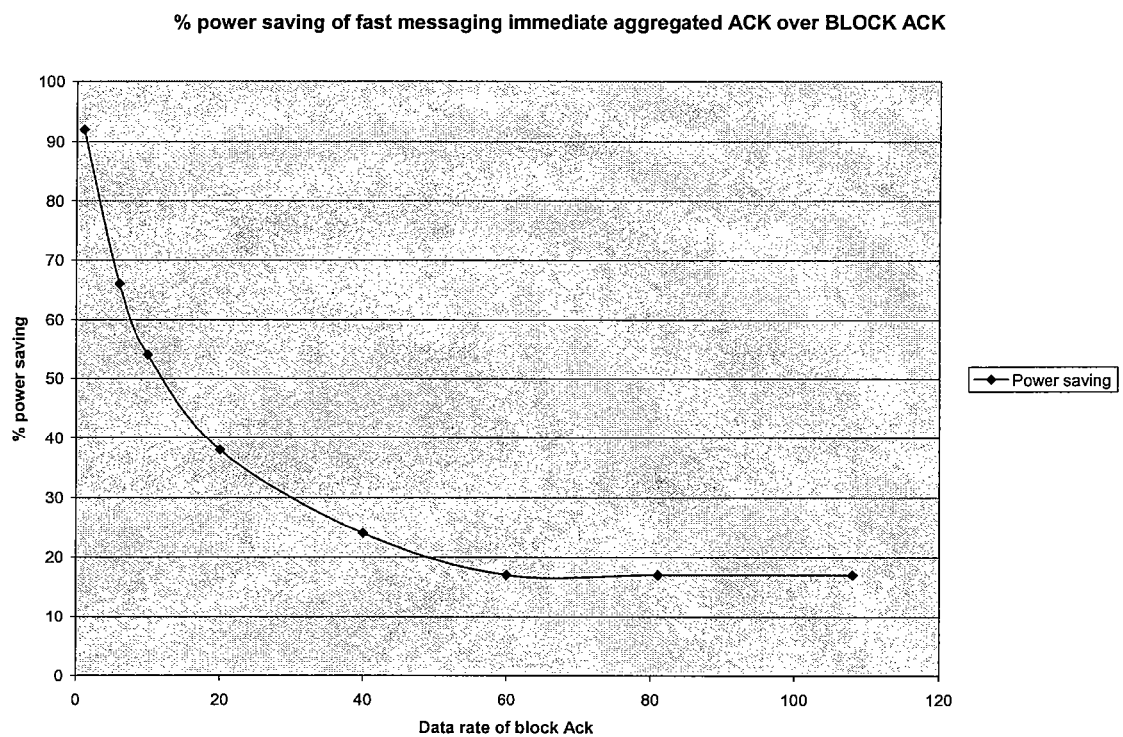
FIG. 10 is a plot of power saving of FCM immediate aggregated ACK over Block ACK.

The immediate aggregated ACK mechanism might be preferred for devices that are sensitive to power consumption. If data flow is mainly downstream and the power saving device only needs to ACK the received data but has no additional data to send back, the amount of power saved with this mechanism compared to sending a block ACK is significant, as indicated in FIG. 10.

As has now been explained, FCM frames can provide for improved performance and/or additional features of a wireless network. A receiver that processes FCM frames has been described in detail, as well as structures and alternatives for the FCM frames themselves. Corresponding FCM frame transmitters would be used to generate and transmit these FCM frames. Such transmitters would typically be part of a networking device and would include the appropriate PHY layer logic, MAC layer logic, etc. to generate the FCM frames described herein. Of course, a networking device that is FCM-enabled will likely combine a transmitter that can generate the frames and a receiver that can receive the frames.

While the invention has been described with respect to exemplary embodiments, one skilled in the art will recognize that numerous modifications are possible. For example, the processes described herein may be implemented using hardware components, software components, and/or any combination thereof. Thus, although the invention has been described with respect to exemplary embodiments, it will be appreciated that the invention is intended to cover all modifications and equivalents within the scope of the following claims.

What is claimed is:

1. In a wireless network, a method of signaling comprising: sending a Physical-Layer Convergence Procedure (PLCP) frame as a fast control messaging (FCM) frame including a PLCP preamble and a modified PLCP header with an FCM indication to signal that the PLCP frame is an FCM frame, the FCM indication providing instruction to a receiver of the PLCP frame that control data is to be extracted from the modified PLCP header and that the receiver is not to attempt to process a PLCP Service Data Unit (PSDU) following the PLCP header if such a PSDU is present in the PLCP frame.

2. The method of claim 1, further comprising setting a bit of the PLCP header as the FCM indication.

3. The method of claim 1, further comprising modifying a Cyclic Redundancy Check (CRC) field of the PLCP header as the FCM indication.

4. The method of claim 3, wherein modifying the CRC field of the PLCP header comprises inverting the CRC field of the PLCP header.

5. The method of claim 3, wherein modifying the CRC field of the PLCP header comprises translating the CRC field by a constant value.

6. The method of claim 3, wherein modifying the CRC field of the PLCP header comprises translating an inversion of the CRC field by a constant value.

7. A communications device including a receiver for receiving signals from a wireless medium, the device comprising:
    receiving circuitry that receives a signal from a transmitter via the wireless medium and converts the signal to a digital sequence;
    physical (PHY) layer logic that processes the received digital sequence, including logic that detects a frame comprising a Physical-Layer Convergence Procedure (PLCP) preamble and a PLCP header and logic that detects whether the PLCP header includes an indicator that the frame is a fast control messaging frame;
    control bit extraction logic that extracts control bits from the PLCP header and disregards a PLCP Service Data Unit (PSDU) following the PLCP header when the PHY layer logic detects the indicator, and that extracts control bits from a PSDU following the PLCP header when the PHY layer logic does not detect the indicator; and
    media access control (MAC) layer logic for processing the extracted control bits when extracted by the control bit extraction logic.

8. The communications device of claim 7, wherein the indicator is one bit of the PLCP header.

9. The communications device of claim 7, wherein the indicator is a modification of a Cyclic Redundancy Check (CRC) field of the PLCP header.

10. The communications device of claim 9, wherein the modification of the CRC field of the PLCP header is an inversion of the CRC field of the PLCP header.

11. The communications device of claim 9, wherein the modification of the CRC field of the PLCP header is a translation of the CRC field by a constant value.

12. The communications device of claim 9, wherein the modification of the CRC field of the PLCP header is a translation of an inversion of the CRC field by a constant value.

13. A computer-readable storage medium having stored thereon computer-executable instructions for receiving signals, the computer-executable instructions comprising:
    a first code segment for receiving a Physical-Layer Convergence Procedure (PLCP) frame having at least a PLCP preamble and a PLCP header;
    a second code segment for determining whether the PLCP header includes a fast control messaging (FCM) indication that identifies the PLCP frame as an FCM frame;
    a third code segment for extracting control data from the PLCP header if it is determined that the PLCP header includes the FCM indication; and
    a fourth code segment for extracting control data from a PLCP Service Data Unit (PSDU) following the PLCP header if it is determined that the PLCP header does not include the FCM indication.

14. The computer-readable storage medium of claim 13, the computer-executable instructions further comprising a fifth code segment for recognizing a modified Cyclic Redundancy Check (CRC) field of the PLCP header as the FCM indication.

15. The computer-readable storage medium of claim 13, the computer-executable instructions further comprising a fifth code segment for recognizing a bit in the PLCP header as the FCM indication.

16. A communications apparatus comprising:
    means for sending a Physical-Layer Convergence Procedure (PLCP) frame as a fast control messaging (FCM) frame including a PLCP preamble and a modified PLCP header with an FCM indication to signal that the PLCP frame is an FCM frame, the FCM indication providing instruction to a receiver of the PLCP frame that control data is to be extracted from the modified PLCP header and that the receiver is not to attempt to process a PLCP Service Data Unit (PSDU) following the PLCP header if such a PSDU is present in the PLCP frame; and means for setting a bit of the PLCP header as the FCM indication.

17. The communications apparatus of claim 16, further comprising means for modifying a Cyclic Redundancy Check (CRC) field of the PLCP header as the FCM indication.

18. The communications apparatus of claim 17, wherein the means for modifying the CRC field comprises means for inverting the CRC field of the PLCP header.

19. The communications apparatus of claim 17, wherein the means for modifying the CRC field comprises means for translating the CRC field by a constant value.

* * * * *